(12) United States Patent
Fang et al.

(10) Patent No.: US 12,251,843 B2
(45) Date of Patent: Mar. 18, 2025

(54) METHOD AND ELECTRONIC DEVICE, SYSTEM AND COMPUTER READABLE MEDIUM FOR CALIBRATION

(71) Applicant: ABB Schweiz AG, Baden (CH)

(72) Inventors: Xinyu Fang, Shanghai (CN); Yichao Mao, Shanghai (CN); Qi Lu, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 334 days.

(21) Appl. No.: 17/758,791

(22) PCT Filed: Jan. 22, 2020

(86) PCT No.: PCT/CN2020/073908
§ 371 (c)(1),
(2) Date: Jul. 13, 2022

(87) PCT Pub. No.: WO2021/147037
PCT Pub. Date: Jul. 29, 2021

(65) Prior Publication Data
US 2023/0045651 A1 Feb. 9, 2023

(51) Int. Cl.
*B25J 9/16* (2006.01)
(52) U.S. Cl.
CPC .................. *B25J 9/1692* (2013.01)
(58) Field of Classification Search
CPC ......... B25J 9/1692; G05B 2219/39011; G05B 2219/39022; G05B 2219/39024; G05B 2219/39026; G05B 2219/39032
See application file for complete search history.

(56) References Cited

U.S. PATENT DOCUMENTS

| 4,402,053 A | 8/1983 | Kelley |
| 4,831,549 A | 5/1989 | Red |
| 6,356,807 B1 | 3/2002 | McGee |
| 2015/0142171 A1 | 5/2015 | Li et al. |

(Continued)

FOREIGN PATENT DOCUMENTS

| CN | 104736304 A | 6/2015 |
| CN | 106457562 A | 2/2017 |

(Continued)

OTHER PUBLICATIONS

International Search Report and Written Opinion, issued by the ISA/CN National Intellectual Property Administration; regarding corresponding patent application Serial No. PCT/CN2020/073908; dated Oct. 20, 2020; 9 pages.

*Primary Examiner* — Ian Jen
*Assistant Examiner* — Renee LaRose
(74) *Attorney, Agent, or Firm* — Greenberg Traurig, LLP

(57) ABSTRACT

Systems, devices, and methods for time calibration. The method can include, in responses to receiving sensing data which indicates a deviation of a tool from an object to be operated by a robot with the tool, triggering the robot to perform a plurality of transformations. Each transformation causing the tool to contact the object at a reference position; determining joint positions of a joint of the robot holding the tool or the object after the plurality of transformations; and determining a position relationship between the tool and the robot at least partially based on the joint positions and the reference position.

12 Claims, 4 Drawing Sheets

(56) References Cited

U.S. PATENT DOCUMENTS

| | | | |
|---|---|---|---|
| 2015/0266183 A1 | 9/2015 | Alifragkis et al. | |
| 2016/0346932 A1 | 12/2016 | Deng et al. | |
| 2017/0021495 A1* | 1/2017 | Davis | G05B 19/4015 |
| 2017/0157770 A1 | 6/2017 | Lundberg | |
| 2018/0243912 A1 | 8/2018 | Deng et al. | |
| 2020/0147799 A1* | 5/2020 | Yamaoka | B25J 9/1692 |

FOREIGN PATENT DOCUMENTS

| | | |
|---|---|---|
| CN | 106903687 A | 6/2017 |
| CN | 107571290 A | 1/2018 |

* cited by examiner

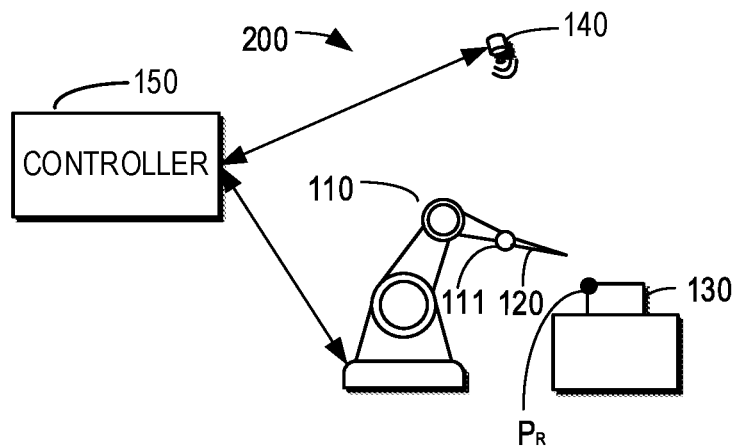
FIG. 2
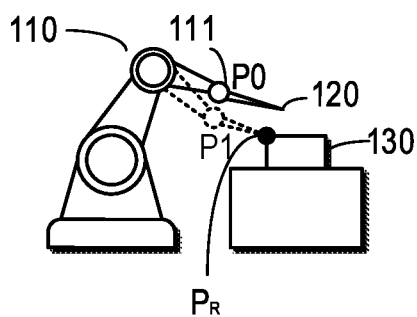
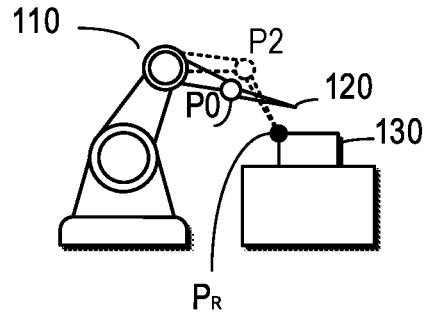
FIG. 3A  FIG. 3B
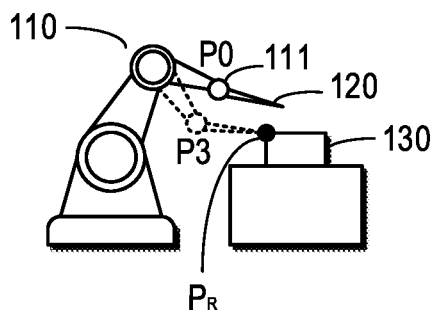
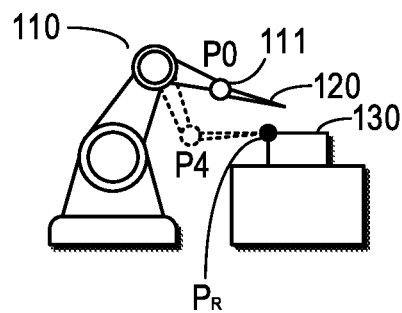
FIG. 3C  FIG. 3D

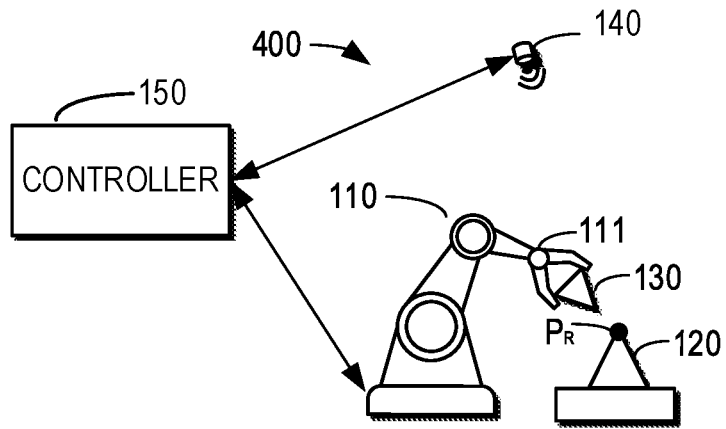
FIG. 4
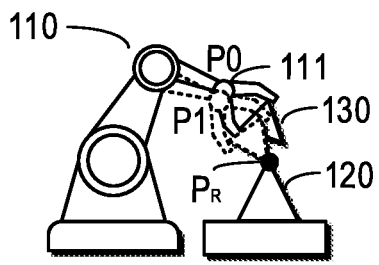 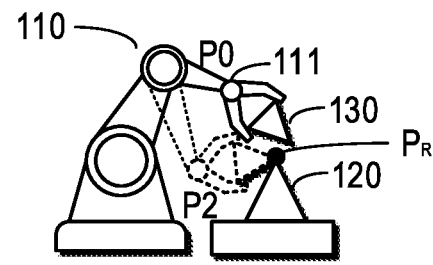
FIG. 5A          FIG. 5B
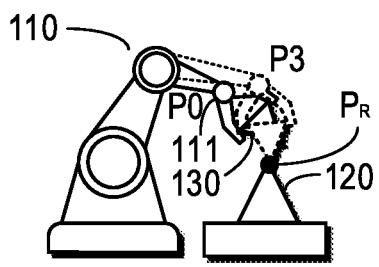 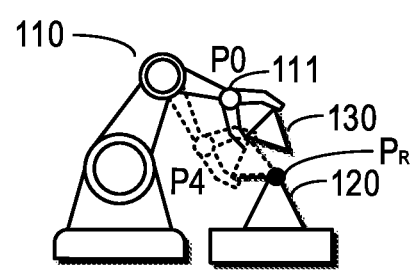
FIG. 5C          FIG. 5D

METHOD AND ELECTRONIC DEVICE, SYSTEM AND COMPUTER READABLE MEDIUM FOR CALIBRATION

CROSS-REFERENCE TO RELATED APPLICATIONS

This is a national stage application which claims priority to International patent application Serial No.: PCT/CN2020/073908, filed on Jan. 22, 2020, and which is herein incorporated by reference in its entirety.

FIELD

Embodiments of the present disclosure generally relate to a method, an electronic device, a system and a computer readable medium for calibration.

BACKGROUND

In industrial automation technology, the industrial robot may be required to operate an object in cooperation with a tool. As an option, the robot may hold a tool and cause the tool to perform specific operation for the object. For example, the tool can be a glue gun. The robot may hold the glue gun to eject the adhesive to the object.

As another option, the tool may be stationary. For example, the tool may be located in a reachable area of the robot and the robot may hold the object and move to a position adjacent to the tool, to cause the object to be operated by the tool. For example, the tool can be a pin. The robot may hold the object, to cause the object to be penetrated by the pin.

There are multiple coordinate systems in the scenarios where the robot and the tool cooperate with each other. For example, a Tool0 (without a tool) coordination system may be referred to as a Cartesian coordinate system with a joint, to be attached with a tool or an object, as the origin. Furthermore, a tool coordinate system may be referred to as a Cartesian coordination system in which the tool center point (TCP) in which the TCP is taken as the origin.

As the position of a joint of the robot can be recorded by a robot controller when the joint is triggered to be transformed, a tool calibration is required for setting the TCP for a specific tool. Therefore, it is to be expected to determine the mapping between the tool coordinate system and the Tool0 coordination system.

SUMMARY

Embodiments of the present disclosure provide a method, an electronic device, a system and a computer readable medium for calibration.

In a first aspect, a method for the time calibration is provided. The method comprises in responses to receiving, from a sensor, sensing data indicating a deviation of a tool from an object to be operated by a robot with the tool, triggering the robot to perform a plurality of transformations, each transformation causing the tool to contact the object at a reference position; determining, based on the feedback data received from the robot, c, the feedback data recording the plurality of transformations of the robot; and determining a position relationship between the tool and the robot at least partially based on the joint positions and the reference position.

In some embodiments, triggering the robot comprises triggering a joint of the robot to perform at least one of the followings: a horizontal motion in a robot coordinate system, an origin of the robot coordinate system being an initial position of the joint before the plurality of transformations; and a rotational motion around a coordinate axis in the robot coordinate system.

In some embodiments, determining the joint positions comprises receiving the feedback data from the robot; obtaining, from the feedback data, a first plurality of coordinate parameters of the joint of the robot in a set of transformed poses in a robot coordinate system, the robot having the set of transformed poses after performing the plurality of transformations; and determining the joint positions in the robot coordinate system based on the first plurality of coordinate parameters of the joint.

In some embodiments, determining the position relationship comprises determining a mapping between a sensor coordinate system and a robot coordinate system based on the sensing data and a first plurality of coordinate parameters of the joint of the robot in a set of transformed poses in the robot coordinate system, the robot having the set of transformed poses after performing the plurality of transformations; determining first reference position information of the reference position in the sensor coordinate system based on the sensing data; and determining the position relationship based on the mapping, the first plurality of coordinate parameters and the first reference position information.

In some embodiments, determining the mapping comprises determining, based on the sensing data, a second plurality of coordinate parameters of the joint of the robot in the set of transformed poses in a sensor coordinate system; and determining the mapping based on the first plurality of coordinate parameters and the second plurality of coordinate parameters.

In some embodiments, determining the position relationship comprises determining second reference position information of the reference position in the robot coordinate system based on the first reference position information and the mapping; determining first tool position information in the robot coordinate system based on the second reference position information; and determining the position relationship in the robot coordinate system based on the first tool position information and the first plurality of coordinate parameters.

In this way, a visual servo method may be achieved. The robot can be guided to transform with different poses, to cause the tool to touch an object to be operated at one or more feature points at the object or the tool. After each transformation, the joint position of the robot can be recorded. According the position of the feature points and the recorded joint position of the robot, the conversion between the tool coordinate system and the Tool0 coordination system can be determined. Thus, the tool coordinate system can be defined and tool could be calibrated automatically.

In a second aspect, an electronic device is provided. The device comprise a processing unit and a memory coupled to the processing unit and having instructions stored thereon, the instructions, when executed by the processing unit, causing the device to execute acts of in responses to receiving, from a sensor, sensing data indicating a deviation of a tool from an object to be operated by a robot with the tool, triggering the robot to perform a plurality of transformations, each transformation causing the tool to contact the object at a reference position; determining, based on the feedback data received from the robot, joint positions of a joint of the robot holding the tool or the object after the plurality of transformations, the feedback data recording the plurality of transformations of the robot; and determining a position relationship between the tool and the robot at least partially based on the joint positions and the reference position.

In some embodiments, triggering the robot comprises triggering a joint of the robot to perform at least one of the followings: a horizontal motion in a robot coordinate system, an origin of the robot coordinate system being an initial position of the joint before the plurality of transformations; and a rotational motion around a coordinate axis in the robot coordinate system.

In some embodiments, determining the joint positions comprises receiving the feedback data from the robot; obtaining, from the feedback data, a first plurality of coordinate parameters of the joint of the robot in a set of transformed poses in a robot coordinate system, the robot having the set of transformed poses after performing the plurality of transformations; and determining the joint positions in the robot coordinate system based on the first plurality of coordinate parameters of the joint.

In some embodiments, determining the position relationship comprises determining a mapping between a sensor coordinate system and a robot coordinate system based on the sensing data and a first plurality of coordinate parameters of the joint of the robot in a set of transformed poses in the robot coordinate system, the robot having the set of transformed poses after performing the plurality of transformations; determining first reference position information of the reference position in the sensor coordinate system based on the sensing data; and determining the position relationship based on the mapping, the first plurality of coordinate parameters and the first reference position information.

In some embodiments, determining the mapping comprises determining, based on the sensing data, a second plurality of coordinate parameters of the joint of the robot in the set of transformed poses in a sensor coordinate system; and determining the mapping based on the first plurality of coordinate parameters and the second plurality of coordinate parameters.

In some embodiments, determining the position relationship comprises determining second reference position information of the reference position in the robot coordinate system based on the first reference position information and the mapping; determining first tool position information in the robot coordinate system based on the second reference position information; and determining the position relationship in the robot coordinate system based on the first tool position information and the first plurality of coordinate parameters.

In a third aspect, a system for calibration is provided. The system comprises a sensor configured to sensing a deviation of a tool from an object to be operated by a robot with the tool and joint positions of a joint of the robot holding the tool or the object when the robot to be triggered to performs a plurality of transformations; and a controller, coupled to the robot and the sensor and configured to perform the acts of the first aspect.

In a fourth aspect, a computer readable medium is provided. The computer readable medium comprises program instructions for causing an electronic device to perform at least the acts of the first aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

FIG. 2 shows an example operating environment in which embodiments of the present disclosure may be implemented;

FIGS. 3A-3D show schematic diagrams of transformations of the joint of the robot;

FIG. 4 shows an example operating environment in which embodiments of the present disclosure may be implemented;

FIGS. 5A-5D show schematic diagrams of transformations of the joint of the robot;

Throughout the drawings, the same or similar reference symbols are used to indicate the same or similar elements.

DETAILED DESCRIPTION

Figure 1:
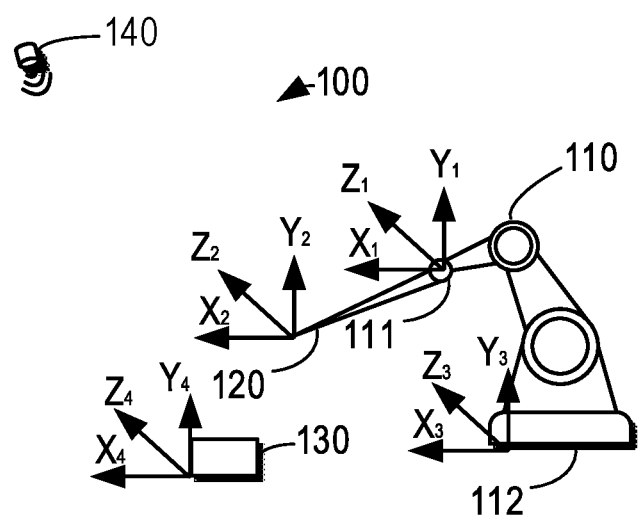
FIG. 1 shows example coordinate systems in an example operating environment in which embodiments of the present disclosure may be implemented.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As described above, in industrial automation technology, the industrial robot may be required to operate an object in cooperation with a tool. As an option, the robot may hold a tool and cause the tool to perform specific operation for the object. As another option, the tool may be stationary. For example, the tool may be located in a reachable area of the robot and the robot may hold the object and move to a position adjacent to the tool, to cause the object to be operated by the tool.

FIG. 1 shows an example operating environment 100 in which embodiments of the present disclosure may be implemented. In this operating environment 100, a tool 120 is attached to a joint 111 of the robot 110. An object 130 is stationary and to be operated by the robot 110 with the tool 120. A sensor 140 may be disposed in the operating environment 100 and can always observe the joint 111, the tool 120 and the object 130.

There are multiple coordinate systems in the operating environment 100. For example, a Tool0 (without a tool) coordination system (hereinafter may also be referred to as a robot coordinate system) may be referred to as a Cartesian coordination system formed by axes $X_1$, $Y_1$ and $Z_1$ with a joint 111 as the origin. Furthermore, a tool coordinate system may be referred to as a Cartesian coordination system formed by axes $X_2$, $Y_2$ and $Z_2$ in which the tool center point (TCP) is taken as the origin.

Herein the term "TCP" may be used to describe the tool in a space. As mentioned above, the origin of the tool coordinate system (TCS) may be considered as TCP. In the TCS, six degrees of freedom or six pieces of information are typically required to completely define the pose of the joint of the robot, because it can move along axes $X_2$, $Y_2$ and $Z_2$ in a space and also rotate around the axes $X_2$, $Y_2$ and $Z_2$.

Furthermore, a base coordinate system may be referred to as a Cartesian coordination system formed by axes $X_3$, $Y_3$ and $Z_3$ with the origin located at the base 112 of the robot 110. A sensor coordinate system may be referred to as a Cartesian coordination system formed by axes $X_4$, $Y_4$ and $Z_4$ with any point which always remains stationary with respect to the robot as the origin.

As the position of a joint of the robot can be recorded by a robot controller when the joint is triggered to be transformed, a tool calibration is required for setting the TCP for a specific tool. Therefore, it is to be expected to determine the mapping between the tool coordinate system and the Tool0 coordination system.

In conventional way, the calibration between the robot coordinate system and the tool coordinate system is performed manually. For example, the feature points of an object are manually touched by a tool attached to the robot joint. The accuracy of this calibration process depends on the skill of the operator and the calibration process is tedious.

Therefore, the embodiments of the present disclosure propose a method and device for the tool calibration. A sensor may be used to sense a deviation from the tool and the object and trigger the robot to perform transformations, such that the tool and the object can touch each other at a reference position. Based on the reference position and joint positions of the robot, the tool coordinate system can be calibrated.

Principle and implementations of the present disclosure will be described in detail below with reference to FIGS. 2 to 5. As described above, the tool calibration for the scenario that the tool 120 is held by the robot 110 may be described with reference to FIGS. 2-3D. FIG. 2 shows an example operating environment 200 in which embodiments of the present disclosure may be implemented. It is to be understood that the multiple coordinate systems in the operating environment 200 may be similar with those in the operating environment 100.

Compared with FIG. 1, the operating environment 200 further comprises a controller 150 coupled to the robot and a sensor 140. The robot 110 may transmit feedback data, which may be obtained by recording the motion of the robot, to the controller 150. The controller 150 may also transmit, to the robot 110, a command for trigger a motion of the robot 110. Also, the sensor 140 may also transmit the sensing data, which may be obtained by sensing the motion of the robot or a position relationship of the robot, the tool and object, to the controller 150. It is to be understood that the sensor 140 and the controller 150 may be integrated in a calibration device. Furthermore, it is possible that the controller 150 may be considered as a calibration device and the sensor 120 may be considered as an external device coupled to the calibration device.

Before the procedure of a fine tool calibration, which will be described in detail with reference to FIGS. 2-3D, a coarse calibration may be required. Referring FIG. 2 in in conjunction with FIG. 1, for example, for the coarse calibration, the joint 111 of the robot 110 may be triggered to perform an orthogonal motion along with any of the axes $X_1$, $Y_1$ and $Z_1$ or the based 112 of the robot 110 may be triggered to perform an orthogonal motion along with any of the axes $X_3$, $Y_3$ and $Z_3$. The robot 110 may transmit the feedback data recording the position of the robot after the motion in the robot coordinate system or in the base coordinate system to the controller 150 and the sensor 140 may also transmit the sensing data recording the position of the robot after the motion in the sensing coordinate system to the controller 150.

Moreover, for the coarse calibration, the joint 111 of the robot 110 may also be triggered to perform a rotation motion around with any of the axes $X_1$, $Y_1$ and $Z_1$. Similarly, the robot 110 may transmit the feedback data recording the position of the robot after the motion in the robot coordinate system or in the base coordinate system to the controller 150 and the sensor 140 may also transmit the sensing data recording the position of the robot after the motion in the sensor coordinate system to the controller 150.

In this way, a conversion relationship between the sensor coordinate system and the robot coordinate system and the base coordinate system may be calibration.

Then the procedure of a fine tool calibration will be further described. As shown in FIG. 2, the sensor 140 may be sense a deviation of the tool 120 from an object 130. The sensor 140 may transmit the sensing data to the controller 150. Then the controller 150 may trigger the robot to perform a plurality of transformations. After each transformation, the tool 120 can contact the object 130, for example, at a reference position Pr. The reference position may be considered as a position of a feature point of the object 130. As shown in FIG. 2 the object 130 may be a cube and the feature point may be any of the corner points of the cube. It is also possible that the tool 120 can contact the object 130 at different reference position after each transformation. For example, the tool 120 can contact the object 130 at a set of corner points of the cube.

In some embodiments, the robot is triggered to perform a plurality of transformations may comprise performing a horizontal motion along with any of the axes $X_1$, $Y_1$ and $Z_1$ in a robot (Tool0) coordinate system, as shown in FIG. 1. The robot is triggered to perform a plurality of transformations may comprise performing a rotational motion around any of the axes $X_1$, $Y_1$ and $Z_1$ in a robot (Tool0) coordinate system.

After each transformation, the joint of the robot may transform from an initial pose to a transformed pose. FIGS. 3A-3D show schematic diagrams of transformations of the joint of the robot. As shown in FIG. 3A, after the first transformation, the joint 111 may transform from an initial pose P0 to a transformed pose P1. Similarly, as shown in FIG. 3B-3D, after the second, the third, the fourth transformations, the joint 111 may transform from an initial pose P0 to a transformed poses P2, P3, P4, respectively. After each transformation of the joint, the tool 120 can contact the object 130 at a reference position Pr. In the fine calibration procedure, the joint may transform to at least four different poses to determine the relationship between the tool and the joint of the robot. It is to be understood that the robot 110 may be triggered to perform more than four transformations.

Then the robot may transmit the feedback recording the plurality of transformations of the robot to the controller 150. The controller 150 may obtain, from the feedback data, a first plurality of coordinate parameters of the joint 111 in a set of transformed poses P1, P2, P3 and P4 after the transformations in a robot coordinate system. Based on the first plurality of coordinate parameters of the joint 111, the controller 150 may determine joint positions of the joint 111 of the robot 110 holding the tool 111 after four transformations.

Then the controller 150 may determine a position relationship between the tool 111 and the robot 110, i.e. the joint 111 at least partially based on the joint positions and the reference position Pr.

In some embodiments, the controller 150 may determine a mapping between a sensor coordinate system and a robot coordinate system. For example, the controller 150 may a second plurality of coordinate parameters of the joint of the robot in the set of transformed poses P1, P2, P3 and P4 after the transformations in a sensor coordinate system based on the sensing data of the sensor 140. Based on the second plurality of coordinate parameters and the first plurality of coordinate parameters of the joint 111 in the set of transformed poses P1, P2, P3 and P4 after the transformations in a robot coordinate system, which may obtain from the feedback data received from the robot 110, the mapping between the sensor coordinate system and the robot coordinate system may be determined.

Then the controller 150 may also determine first reference position information of the reference position Pr in the sensor coordinate system based on the sensing data. The controller 150 may also determine the second reference position information of the reference position in the robot coordinate system based on the first reference position information and the mapping between the sensor coordinate system and the robot coordinate system.

Since the tool and the object contact with each other at the reference position Pr, the second reference position information of the reference position in the robot coordinate system can be considered as the tool position in the robot coordinate system. Thus, the controller 150 may be determine position relationship between the tool and the robot in the robot coordinate system based on the second reference position information of the reference position in the robot coordinate system and the second plurality of coordinate parameters of the joint 111 in the set of transformed poses P1, P2, P3 and P4 after the transformations in a robot coordinate system. In this way, a fine tool calibration may be realized in an automatic way.

As mentioned above, in another option, the tool may be stationary. For example, the tool may be located in a reachable area of the robot. An object may be held by the robot and move to a position adjacent to the tool along with the motion of the robot, to cause the object to be operated by the tool.

The tool calibration for the scenario that the tool 120 is stationary may be described with reference to FIGS. 4-5D. FIG. 4 shows an example operating environment 400 in which embodiments of the present disclosure may be implemented. It is to be understood that the multiple coordinate systems in the operating environment 400 may be similar with those in the operating environment 100.

As shown in FIG. 4, the object 130 may be gripped by the robot 111. To better describe the disclosure, the offset between the joint and the object 130 caused by the gripper can be ignored. The object 130 can be considered as attaching to the joint 111 directly. The tool 120 may be stationary and located on the ground. The same components shown in the FIG. 4 as in FIG. 2 are not repeated here.

The coarse calibration described with FIGS. 1 and 2 can also be performed in the operating environment 400, to calibrate a conversion relationship between the sensor coordinate system and the robot coordinate system and the base coordinate system.

Then the procedure of a fine tool calibration will be further described. As shown in FIG. 4, the sensor 140 may be sense a deviation of the tool 120 from an object 130. The sensor 140 may transmit the sensing data to the controller 150. Then the controller 150 may trigger the robot to perform a plurality of transformations. After each transformation, the object 130 can contact the tool 120, for example, at a reference position Pr of the tool 120. The reference position may be considered as a position of a feature point of the tool 120. As shown in FIG. 4, tool 120 may be a circular cone and the feature point may be a corner point of the circular cone.

It is also possible that the object 130 can contact the tool 120 with a feature position of the object 130. For example, the object 130, as shown, is a circular cone and the object 130 can contact the tool 120 with its corner point of the circular cone. In this case, the reference position may be the position of the feature point of the object 130 after the transformation of the robot.

In some embodiments, the robot is triggered to perform a plurality of transformations may comprise performing a horizontal motion along with any of the axes X1, Y1 and Z1 in a robot (Tool0) coordinate system, as shown in FIG. 1. The robot is triggered to perform a plurality of transformations may comprise performing a rotational motion around any of the axes X1, Y1 and Z1 in a robot (Tool0) coordinate system.

After each transformation, the joint 111 of the robot may transform from an initial pose to a transformed pose. FIGS. 5A-5D show schematic diagrams of transformations of the joint 111 of the robot 110. As shown in FIG. 5A, after the first transformation, the joint 111 may transform from an initial pose P0 to a transformed pose P1. Similarly, as shown in FIG. 5B-5D, after the second, the third, the fourth transformations, the joint 111 may transform from an initial pose P0 to a transformed poses P2, P3, P4, respectively. After each transformation of the joint, the object 130 can contact the tool 120 at a reference position Pr. In the fine calibration procedure, the joint may transform to at least four different poses to determine the relationship between the tool and the joint of the robot. It is to be understood that the robot 110 may be triggered to perform more than four transformations.

Then the robot may transmit the feedback recording the plurality of transformations of the robot to the controller 150. The controller 150 may obtain, from the feedback data, a first plurality of coordinate parameters of the joint 111 in a set of transformed poses P1, P2, P3 and P4 after the transformations in a robot coordinate system. Based on the first plurality of coordinate parameters of the joint 111, the controller 150 may determine joint positions of the joint 111 of the robot 110 holding the object 130 after four transformations.

Then the controller 150 may determine a position relationship between the tool 111 and the robot 110, i.e. the joint 111 at least partially based on the joint positions and the reference position Pr.

In some embodiments, the controller 150 may determine a mapping between a sensor coordinate system and a robot coordinate system. For example, the controller 150 may a second plurality of coordinate parameters of the joint of the robot in the set of transformed poses P1, P2, P3 and P4 after the transformations in a sensor coordinate system based on the sensing data of the sensor 140. Based on the second plurality of coordinate parameters and the first plurality of coordinate parameters of the joint 111 in the set of transformed poses P1, P2, P3 and P4 after the transformations in a robot coordinate system, which may obtain from the feedback data received from the robot 110, the mapping between the sensor coordinate system and the robot coordinate system may be determined.

Then the controller 150 may also determine first reference position information of the reference position Pr in the sensor coordinate system based on the sensing data. The controller 150 may also determine the second reference position information of the reference position in the robot coordinate system based on the first reference position information and the mapping between the sensor coordinate system and the robot coordinate system.

Since the tool and the object contact with each other at the reference position Pr, the second reference position information of the reference position in the robot coordinate system can be considered as the tool position in the robot coordinate system. Thus, the controller 150 may be determine position relationship between the tool and the robot in the robot coordinate system based on the second reference position information of the reference position in the robot coordinate system and the second plurality of coordinate parameters of the joint 111 in the set of transformed poses P1, P2, P3 and P4 after the transformations in a robot coordinate system. In this way, a visual servo method may be achieved. The robot can be guided to transform with different poses, to cause the tool to touch an object to be operated at one or more feature points at the object or the tool. After each transformation, the joint position of the robot can be recorded. According the position of the feature points and the recorded joint position of the robot, the conversion between the tool coordinate system and the Tool0 coordination system can be determined. Thus, the tool coordinate system can be defined and tool could be calibrated automatically.

Figure 6:
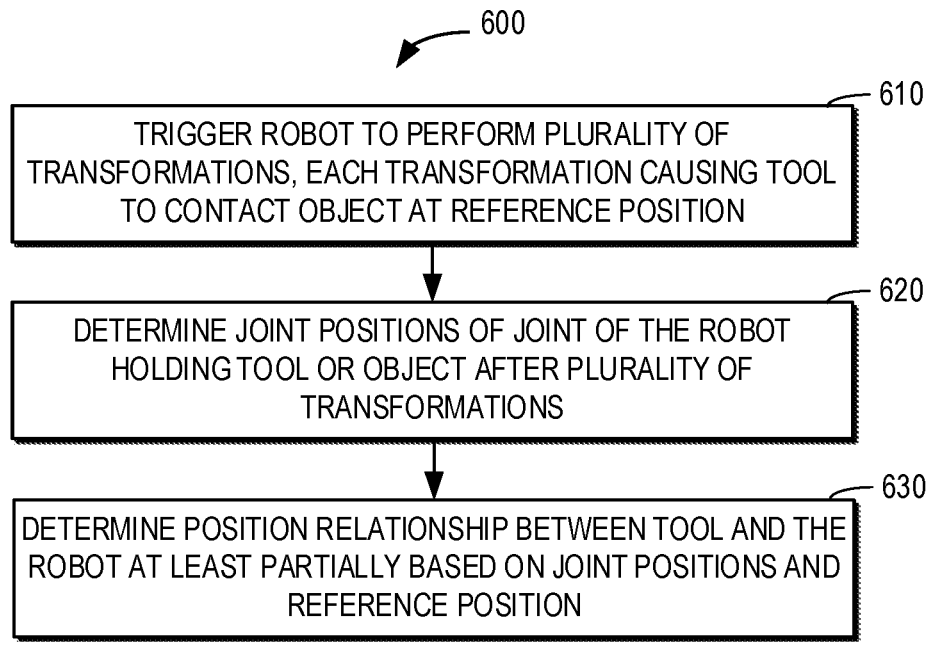
FIG. 6 shows a flowchart illustrating a method for calibration according to embodiments of the present disclosure.

FIG. 6 shows a flowchart illustrating a method 600 for time calibration according to embodiments of the present disclosure. For the purpose of discussion, the method 600 will be described with reference to FIGS. 1, 2 and 4. It would be appreciated that although the method 400 has been described in the operating environment 100 of FIG. 1, the operating environment 200 of FIG. 2 and the operating environment 400 of FIG. 4, the method 600 may be likewise applied to other operating environments.

At 610, if the controller 150 receives, from a sensor, sensing data indicating a deviation of a tool from an object to be operated by a robot with the tool, the controller 150 triggers the robot to perform a plurality of transformations. Each transformation may cause the tool to contact the object at a reference position.

In some embodiments, triggering the robot comprises triggering a joint of the robot to perform at least one of the followings: a horizontal motion in a robot coordinate system, an origin of the robot coordinate system being an initial position of the joint before the plurality of transformations; and a rotational motion around a coordinate axis in the robot coordinate system.

At 620, the controller 150 determines, based on the feedback data received from the robot, joint positions of a joint of the robot holding the tool or the object after the plurality of transformations. The feedback data may record the plurality of transformations of the robot.

In some embodiments, determining the joint positions comprises receiving the feedback data from the robot; obtaining, from the feedback data, a first plurality of coordinate parameters of the joint of the robot in a set of transformed poses in a robot coordinate system, the robot having the set of transformed poses after performing the plurality of transformations; and determining the joint positions in the robot coordinate system based on the first plurality of coordinate parameters of the joint.

At 630, the controller 150 determines a position relationship between the tool and the robot at least partially based on the joint positions and the reference position.

In some embodiments, determining the position relationship comprises determining a mapping between a sensor coordinate system and a robot coordinate system based on the sensing data and a first plurality of coordinate parameters of the joint of the robot in a set of transformed poses in the robot coordinate system, the robot having the set of transformed poses after performing the plurality of transformations; determining first reference position information of the reference position in the sensor coordinate system based on the sensing data; and determining the position relationship based on the mapping, the first plurality of coordinate parameters and the first reference position information.

In some embodiments, determining the mapping comprises determining, based on the sensing data, a second plurality of coordinate parameters of the joint of the robot in the set of transformed poses in a sensor coordinate system; and determining the mapping based on the first plurality of coordinate parameters and the second plurality of coordinate parameters.

In some embodiments, determining the position relationship comprises determining second reference position information of the reference position in the robot coordinate system based on the first reference position information and the mapping; determining first tool position information in the robot coordinate system based on the second reference position information; and determining the position relationship in the robot coordinate system based on the first tool position information and the first plurality of coordinate parameters.

Furthermore, the present disclosure may also propose a system for calibration is provided. The system comprises a sensor configured to sensing a deviation of a tool from an object to be operated by a robot with the tool and joint positions of a joint of the robot holding the tool or the object when the robot to be triggered to performs a plurality of transformations; and a controller, coupled to the robot and the sensor and configured to perform the method 600 shown in FIG. 6.

It is to be understood that the system may be implemented with any hardware and software. For example, the system may be implemented as the controller 150 as shown in FIGS. 1, 2 and 4. For example, the system may be implemented as the controller 150 with sensor 140 as shown in FIGS. 1, 2 and 4. It is to be understood that the number of sensors shown in FIGS. 1, 2 and 4 is given for the purpose of illustration without suggesting any limitations. The operating environment 100 may include any suitable number of sensors.

The system may also be implemented as an integrate chip. The components of the system may be considered as entities capable of performing certain functions, such as data collectors, estimators, instruction generators, and the like. The components in the system may also be considered as virtual modules capable of implementing certain functions.

Figure 7:
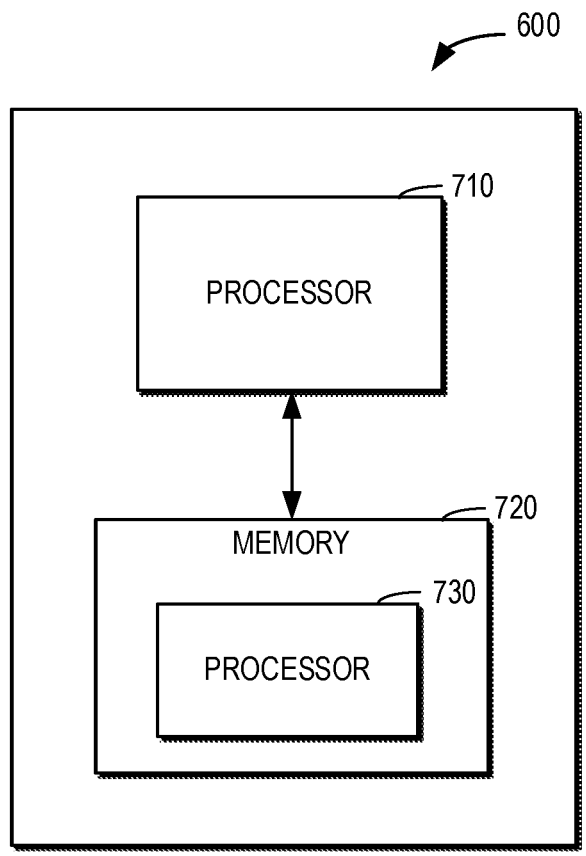
FIG. 7 shows a block diagram of an example computer readable medium in accordance with some example embodiments of the present disclosure.

FIG. 7 is a simplified block diagram of a device 700 that is suitable for implementing embodiments of the present disclosure. The device 700 may be provided to implement the method 600 shown in FIG. 6. As illustrated in FIG. 7, the device 700 may comprise a computer processor 710 coupled to a computer-readable memory unit 720, and the memory unit 720 comprises instructions 722. When executed by the computer processor 710, the instructions 722 may implement the method for operating the robot as described in the preceding paragraphs, and details will be omitted hereinafter.

In some embodiments of the present disclosure, a computer readable medium for simulating the at least one object in the manufacturing line is provided. The computer readable medium has instructions stored thereon, and the instructions, when executed on at least one processor, may cause at least one processor to perform the method for operating the robot as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A calibration method comprising:
   in response to receiving, from a sensor, sensing data indicating a deviation of a tool from an object to be operated by a robot with the tool, triggering the robot to perform a plurality of transformations, each transformation causing the tool to contact the object at a reference position;
   determining, based on feedback data received from the robot, joint positions of a joint of the robot holding the tool or the object after the plurality of transformations, the feedback data recording the plurality of transformations of the robot; and
   determining a position relationship between the tool and the robot at least partially based on the joint positions and the reference position, wherein determining the joint positions comprises:
receiving the feedback data from the robot;
obtaining, from the feedback data, a first plurality of coordinate parameters of a joint of the robot in a set of transformed poses in a robot coordinate system, the robot having the set of transformed poses after performing the plurality of transformations; and
determining the joint positions in the robot coordinate system based on the first plurality of coordinate parameters of the joint.

2. The calibration method of claim 1, wherein triggering the robot comprises triggering the joint of the robot to perform at least one of:
a horizontal motion in the robot coordinate system, an origin of the robot coordinate system being an initial position of the joint before the plurality of transformations; or
a rotational motion around a coordinate axis in the robot coordinate system.

3. The calibration method of claim 1, wherein determining the position relationship comprises:
determining a mapping between a sensor coordinate system and the robot coordinate system based on the sensing data and the first plurality of coordinate parameters of the joint of the robot in the set of transformed poses in the robot coordinate system, the robot having the set of transformed poses after performing the plurality of transformations;
determining first reference position information of the reference position in the sensor coordinate system based on the sensing data; and
determining the position relationship based on the mapping, the first plurality of coordinate parameters and the first reference position information.

4. The calibration method of claim 3, wherein determining the mapping comprises:
determining, based on the sensing data, a second plurality of coordinate parameters of the joint of the robot in the set of transformed poses in the sensor coordinate system; and
determining the mapping based on the first plurality of coordinate parameters and the second plurality of coordinate parameters.

5. The calibration method of claim 3, wherein determining the position relationship comprises:
determining second reference position information of the reference position in the robot coordinate system based on the first reference position information and the mapping;
determining first tool position information in the robot coordinate system based on the second reference position information; and
determining the position relationship in the robot coordinate system based on the first tool position information and the first plurality of coordinate parameters.

6. An electronic device, comprising:
a processing unit; and
a memory coupled to the processing unit and having instructions stored thereon, the instructions, when executed by the processing unit, causing the electronic device to execute acts, the acts comprising:
in response to receiving, from a sensor, sensing data indicating a deviation of a tool from an object to be operated by a robot with the tool, triggering the robot to perform a plurality of transformations, each transformation causing the tool to contact the object at a reference position;
determining, based on feedback data received from the robot, joint positions of a joint of the robot holding the tool or the object after the plurality of transformations, the feedback data recording the plurality of transformations of the robot; and
determining a position relationship between the tool and the robot at least partially based on the joint positions and the reference position,
wherein determining the position relationship comprises:
determining a mapping between a sensor coordinate system and a robot coordinate system based on the sensing data and a first plurality of coordinate parameters of the joint of the robot in a set of transformed poses in the robot coordinate system, the robot having the set of transformed poses after performing the plurality of transformations;
determining a first reference position information of the reference position in the sensor coordinate system based on the sensing data; and
determining a first position relationship based on the mapping, the first plurality of coordinate parameters, and the first reference position information.

7. The electronic device of claim 6, wherein triggering the robot comprises triggering the joint of the robot to perform at least one of:
a horizontal motion in the robot coordinate system, an origin of the robot coordinate system being an initial position of the joint before the plurality of transformations; or
a rotational motion around a coordinate axis in the robot coordinate system.

8. The electronic device of claim 6, wherein determining the joint positions comprises:
receiving the feedback data from the robot;
obtaining, from the feedback data, the first plurality of coordinate parameters of the joint of the robot in the set of transformed poses in the robot coordinate system, the robot having the set of transformed poses after performing the plurality of transformations; and
determining the joint positions in the robot coordinate system based on the first plurality of coordinate parameters of the joint.

9. The electronic device of claim 6, wherein determining the mapping comprises:
determining, based on the sensing data, a second plurality of coordinate parameters of the joint of the robot in the set of transformed poses in the sensor coordinate system; and
determining the mapping based on the first plurality of coordinate parameters and the second plurality of coordinate parameters.

10. The electronic device of claim 6, wherein determining the position relationship comprises:
determining second reference position information of the reference position in the robot coordinate system based on the first reference position information and the mapping;
determining first tool position information in the robot coordinate system based on the second reference position information; and
determining the position relationship in the robot coordinate system based on the first tool position information and the first plurality of coordinate parameters.

11. A system for calibration comprising:
a sensor configured to sense a deviation of a tool from an object to be operated by a robot with the tool and positions of a joint of the robot holding the tool or the object when the robot to be triggered performs a plurality of transformations; and a controller coupled to the robot and the sensor and configured to perform the method of claim 1.

12. A computer readable medium comprising program instructions for causing an electronic device to perform at least the method of claim 1.

* * * * *